Figure 1:
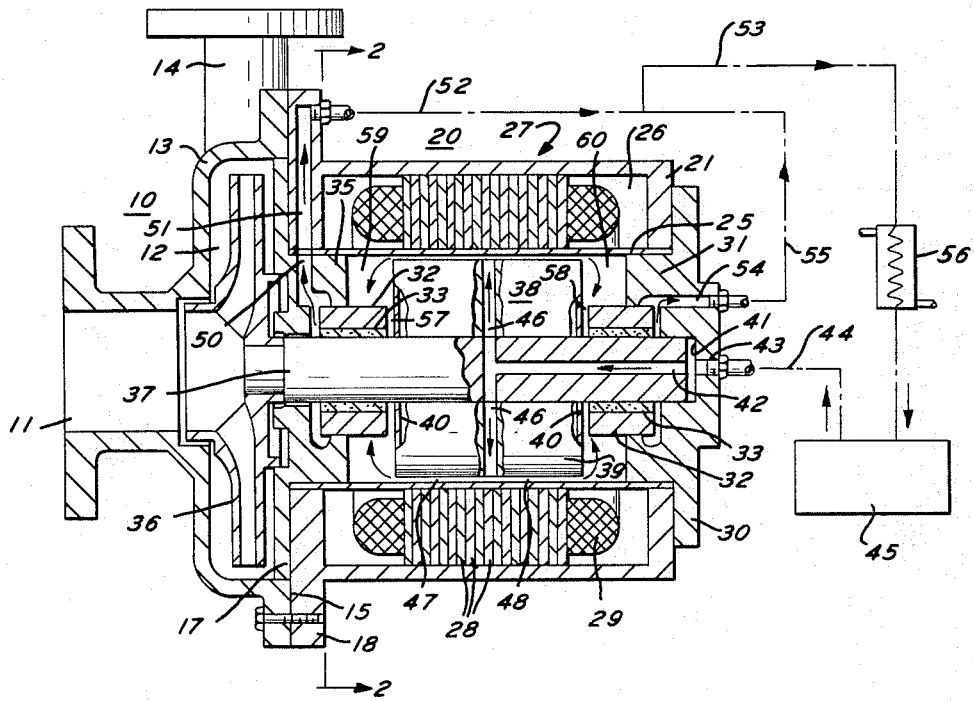

July 19, 1966  H. T. WHITE  3,261,295

MOTOR DRIVEN PUMP

Filed June 3, 1964

INVENTOR
HOWARD T. WHITE

ATTORNEY

3,261,295
MOTOR DRIVEN PUMP
Howard T. White, Upper Moreland Township, Montgomery County, Pa., assignor, by mesne assignments, to Crane Co., New York, N.Y., a corporation of Illinois
Filed June 3, 1964, Ser. No. 372,260
4 Claims. (Cl. 103—87)

This invention relates to motor driven pumps.

It has heretofore been proposed to provide a pressure balancing chamber for a pump impeller to control the axial positioning of the impeller. One such arrangement is shown in my prior Patent No. 3,053,189.

It has also heretofore been proposed as in my prior application Serial No. 87,855, filed February 8, 1961, now Patent No. 3,138,105, to provide a pressure balancing chamber bounded by a fixed orifice provided between the periphery of an enclosed or "canned" motor rotor and a motor stator isolating sleeve and by a variable orifice at the end of the motor shaft.

The apparatus of the present invention provides improved pressure balancing arrangements which are particularly suitable for but are not limited to large pumps.

It is the principal object of the present invention to provide a motor driven pump having pressure balancing or positioning of the motor rotor which is effected by the circulation of fluid through the interior of the motor rotor and the application of balancing forces on one or more ends of the motor rotor.

It is a further object of the present invention to provide a motor driven pump having improved structure for balancing axial thrust in which the motor rotor has fixed orifices along the periphery with variable orifices between the ends of the motor rotor and the inner end faces of the bearings.

It is a further object of the present invention to provide a motor driven pump having improved structure for balancing axial thrust in which radial passageways in the motor rotor can be utilized to impel the fluid for balancing.

It is a further object of the present invention to provide a motor driven pump having improved structure for balancing axial thrust which permits of reduction or elimination of wearing rings now considered essential to accommodate axial thrust.

It is a further object of the invention to provide a motor driven pump having improved structure for fluid pressure balancing of axial thrust which permit the reduction or elimination of impeller circulation flow for cooling and lubrication, and in and of itself supplies sufficient fluid flow for that cooling and lubrication.

It is a further object of the present invention to provide a motor driven pump having an improved arrangement for fluid circulation for axial balancing and which by increasing the fluid pressure in the motor rotor chamber, increases the stability of the cooling.

Other objects and advantageous features of the invention will be apparent from the description and claims.

Figure 2:
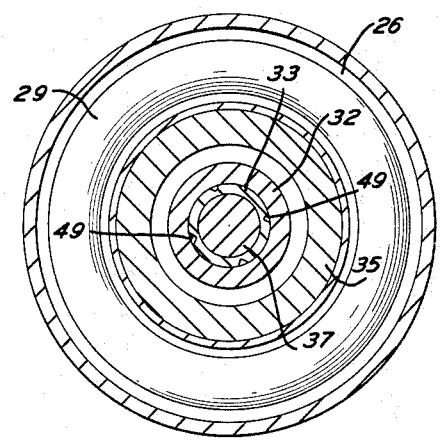

The nature and characteristic features of the invention will be more readily understood from the following description taken in connection with the accompanying drawings forming part thereof, in which:

FIGURE 1 is a vertical longitudinal central sectional view of a motor driven pump in accordance with the invention, parts being shown diagrammatically; and FIG. 2 is a transverse vertical sectional view taken approximately on the line 2—2 of FIG. 1.

It should, of course, be understood that the description and drawings herein are illustrative merely, and that various modifications and changes can be made in the structure disclosed without departing from the spirit of the invention.

Referring now more particularly to the drawings, in which a preferred embodiment of the invention is illustrated, an impeller housing 10 is provided having a longitudinal axial centrally disposed fluid inlet connection 11 in communication with an interior fluid space or impeller chamber 12. The fluid space 12 is enclosed within a scroll 13 of well known type. The impeller housing 10 has a fluid delivery connection 14 formed thereon and in communication with the interior of the scroll 13, for delivery of the fluid being pumped.

The impeller housing 10 has an end face 15 with a liner plate 17 aligned therewith. A motor housing end plate 18 is provided to which the liner plate 17 can be secured in any desired manner. The impeller housing 10 is also secured to the end plate 18 in a well known manner.

The end plate 18 is preferably part of a motor housing 20 which has an end plate 21 at the opposite end.

The end plates 18 and 21 have extending therebetween a cylindrical sleeve 25 of any desired material which is nonmagnetic responsive and which is resistant to corrosion by the liquid being pumped. For a number of types of installations the sleeve 25 can advantageously be of stainless steel. The sleeve 25 is secured at its ends in fluid tight relation in any desired manner, such as by linear welding, to the end plates 18 and 21. The sleeve 25, with the housing 20, provides an isolated motor stator chamber 26 within which the motor stator 27 of an alternating current motor is disposed.

The stator 27 includes stator laminations 28 and windings 29.

An end closure plate 30 is provided mounted on and secured to the end plate 21 and has an inwardly extending portion or boss 31 extending within the sleeve 25 in fluid tight relation. The end plate portion 31 has a bearing retaining ring 32 mounted therein within which a bearing ring 33 of carbon or of any other desired type is carried, such for example as that shown in my prior Patent No. 2,741,990 and which permits fluid flow therealong. The liner plate 17 preferably also has an inwardly disposed boss portion 35 extending within the sleeve 25, and preferably in fluid tight relation and within which a bearing retainer ring 32 and bearing 33 is mounted. The bearings have inner faces 34.

A fluid impeller 36 disposed within the scroll 13 is carried on a shaft 37 which is journalled in the bearings 33, and has a motor rotor 38 secured thereto inwardly of the motor stator 27. The motor rotor 38 can be of any desired type but is preferably of the short circuited type and enclosed within an outer casing, having a peripheral enclosure 39 and end cover plates 40, as shown in my prior Patent No. 3,111,090. The enclosure 39 and end cover plates 40 provide what is known as a "canned" rotor. The structure heretofore described is conventional and well known type and has formed the basis for design and construction of many motor driven pumps.

In accordance with the present invention, the shaft 37 extends within an opening 41 in the end closure plate 30 and is provided with an interior axially extending passageway 42 terminating at a location intermediate the rotor end plates 40. The opening 41 has a fluid connection 43 to which a pipe 44 is connected. The pipe 44 extends from a sump 45.

Intermediate the ends of the motor rotor 38, a plurality of radially extending passageways 46 are provided to which the passageway 42 extends. Fluid can be supplied from the sump 45 under pressure, if desired, but it is preferred to utilize the passageways 46 as "impeller passageways" thus avoiding the necessity for any auxiliary pump.

The passageways 46 can be formed in the motor rotor in any desired manner, preferably are between the short circuited bars thereof, and preferably are made fluid tight at their interior and at their intersection with the enclosure 39 to avoid corrosion by liquid passing therethrough.

The passageways 46 can be located equidistant from the end plates 40 or can be moved toward or away from the impeller 36 to provide between the enclosure 39 and the interior of the sleeve 35 fixed orifices 47 and 48 of predetermined length and in accordance with the desired biasing of the balancing action applied on the motor rotor 38, this being determined in part upon the axial thrust transferred to the shaft 37 by the fluid impeller 36. The bearing rings 33 have fluid passageways 49 therealong, and the boss 35 and end housing plate 18 have connected passageways 50 and 51 from which a return pipe 52 extends to a return pipe 53, which extends to the sump 45. The end closure plate 30 also has a passageway 54 from which a pipe 55 extends to the pipe 53 for fluid return. A fluid cooling unit 56 can be provided in the pipe 53.

The end faces 34 are initially spaced as desired with respect to the end plates 40 of the motor rotor 38 to provide orifices 57 and 58 which function as variable orifices between the rotor end plates 40 and the bearing end faces 34. Balancing fluid chambers 59 and 60 are thus provided within the sleeve 25 and between the boss 31 and the boss portion 35 with fixed inlet orifices 47 and 48 between the periphery of the motor rotor 38 and the interior surface of the sleeve 25 and with variable outlet orifices 57 and 58 between the end plates 40 of the motor rotor 38 and the end faces 34.

Upon energization of the windings 29 a rotating field is set up in the stator laminations 28 and the motor rotor 38 is caused to rotate. Rotation of the motor rotor 38 effects rotation of the shaft 37 and the fluid impeller 36 carried thereby. Fluid supplied through the inlet connection 11 is delivered by the fluid impeller 36 to the outer portion of the impeller chamber 12 and to the scroll 13 for delivery through the fluid connection 14. The fluid impeller 36 in operation imparts a longitudinal axial thrust to the shaft 37.

Upon rotation of the motor rotor 38, fluid is supplied from the sump 45 and through the shaft passageway 42, is impelled by the passageways 46 and passes axially in opposite directions therefrom along the orifices 47 and 48, to the balancing chambers 59 and 60, and through the variable orifices 57 and 58. Fluid from the chamber 59 passes through the bearing passageways 49 and the passageways 50 and 51 to the pipe 52 and through the pipe 53 to the sump 45. Fluid from the chamber 60 passes through the bearing passageways 49 and through the passageways 54 and the pipe 55 to the pipe 53 for return to the sump 45.

The pressure balancing chambers 59 and 60 have pressures therein determined by the variable orifices 57 and 58 which permit the discharge of fluid therefrom dependent upon the size of the orifices 57 and 58. If the clearance at a variable orifice such as the orifice 57 is caused to decrease, then the pressure in the chamber 59 tends to increase, and move the motor rotor 38 to increase the size of the orifice 57 and permit more rapid discharge and pressure drop in the chamber 59. If the pressure in the chamber 59 tends to decrease then the effect thereof on the motor rotor 38 is to tend to move the motor rotor 38 to decrease the size of the orifice with pressure build up. The action of the chamber 60 is the same but in the opposite direction. A pressure balancing action is thus provided between the chambers 59 and 60 to accommodate the thrust of the impeller 36. The balancing action reduces or even eliminates the necessity for end wear rings or end bearings at the bearing rings 33. The balancing action is independent of the pumping action by the impeller 36 and is dependent rather upon the speed of rotation of the shaft 37 and size of the passageways 46.

The balancing or positioning of the motor rotor 38 and thereby of the shaft 37 and impeller 36 by the pressures effective in the chambers 59 and 60 tends to assure the retention of the motor rotor 38 at an equilibrium or balanced condition, with a minimum of movement required to restore the equilibrium and balanced condition. The fluid circulating through the bearing passageways 49 and between the bearing rings 33 and the shaft 37 is effective for cooling and for lubricating the contacting surfaces, while at the same time the fluid in the chambers 59 and 60, and at the orifices 57 and 58 serves as a cushion and prevents abrasion of the end plates 40. The pressures at the passageways 50 and at the right side of the impeller 36 at the shaft 37 can be predetermined to be substantially equal or to permit a small fluid flow in either direction as desired.

I claim:
1. Axial thrust balancing apparatus for a motor driven unit comprising
   a motor stator,
   a cylindrical sleeve interiorly of said motor stator,
   a motor rotor in said sleeve,
   said rotor and said sleeve having a longitudinal clearance space therebetween and defining with said sleeve at least one fixed size orifice,
   said motor rotor having an outwardly extending fluid impelling passageway intermediate its ends communicating with said clearance space intermediate its ends,
   a shaft on which said motor rotor is carried having a fluid passageway therein communicating with said outwardly extending fluid passageway,
   a source of fluid connected to said shaft passageway,
   members closing the end of said sleeve through at least one of which said shaft extends,
   an end member through which said shaft extends having a portion carried thereby with respect to which one end of said rotor is movable and providing a variable orifice,
   said sleeve and said end member bounding a fluid pressure balancing chamber at one end of said rotor to which fluid input is controlled by said fixed orifice and fluid discharge by said variable orifice,
   the pressure in said balancing chamber controlling the positioning of said motor rotor and thereby controlling said variable orifice.

2. Axial thrust balancing apparatus as defined in claim 1 in which
   said clearance space has fixed orifices axially of said fluid impelling passageway in opposite directions,
   the other end of said rotor has a pressure fluid balancing chamber bounded by the other end of said rotor and by said sleeve and said other end member,
   said other end member has a portion carried thereby with respect to which the other end of said rotor is movable to provide a second variable orifice,
   said sleeve and said other end member bounding a second fluid pressure balancing chamber at the other end of said rotor to which fluid input is controlled by one of said fixed orifices and by said second variable orifice,
   the pressures in said balancing chambers controlling the positioning of said motor rotor and thereby controlling said variable orifices.

3. Axial thrust balancing apparatus as defined in claim 1 in which
said end member portion includes a bearing for said shaft.

4. Axial thrust balancing apparatus as defined in claim 2 in which
said other end member portion includes a bearing for said shaft.

References Cited by the Examiner
UNITED STATES PATENTS

| | | | |
|---|---|---|---|
| 2,891,391 | 6/1959 | Kocher et al. | 103—87 |
| 2,953,993 | 9/1960 | Strickland et al. | 103—112 X |
| 3,031,973 | 5/1962 | Kramer | 103—112 X |

ROBERT M. WALKER, *Primary Examiner.*